(12) United States Patent
Setty et al.

(10) Patent No.: US 11,601,439 B2
(45) Date of Patent: *Mar. 7, 2023

(54) VERIFIABLE OUTSOURCED LEDGERS

(71) Applicant: Microsoft Technology Licensing, LLC., Redmond, WA (US)

(72) Inventors: Srinath Setty, Redmond, WA (US); Ramarathnam Venkatesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,155

(22) Filed: Feb. 13, 2020

(65) Prior Publication Data
US 2020/0259843 A1    Aug. 13, 2020

Related U.S. Application Data

(63) Continuation of application No. 15/280,806, filed on Sep. 29, 2016, now Pat. No. 10,587,628.

(51) Int. Cl.
*H04L 9/40*   (2022.01)
*H04L 9/32*   (2006.01)
*H04L 9/06*   (2006.01)
*H04L 67/10*  (2022.01)
*H04L 9/00*   (2022.01)

(52) U.S. Cl.
CPC ............ *H04L 63/12* (2013.01); *H04L 9/0643* (2013.01); *H04L 9/3239* (2013.01); *H04L 9/3247* (2013.01); *H04L 67/10* (2013.01); *H04L 9/50* (2022.05); *H04L 2209/56* (2013.01)

(58) Field of Classification Search
CPC ....... H04L 63/12; H04L 67/10; H04L 9/3239; H04L 9/3247; H04L 9/0643; H04L 2209/38; H04L 2209/56; H04L 9/50
See application file for complete search history.

(56) References Cited

U.S. PATENT DOCUMENTS

| | | | | |
|---|---|---|---|---|
| 5,878,141 A * | 3/1999 | Daly | ...................... | G06Q 20/04 235/379 |
| 6,411,985 B1 * | 6/2002 | Fujita | ...................... | G06F 16/27 709/201 |
| 6,886,038 B1 * | 4/2005 | Tabbara | ................ | H04L 69/329 709/224 |
| 7,280,956 B2 * | 10/2007 | Cross | ...................... | G06F 21/10 713/168 |
| 2014/0337175 A1 * | 11/2014 | Katzin | ................ | G06Q 20/367 705/26.62 |
| 2015/0294308 A1 * | 10/2015 | Pauker | ................... | G06Q 20/02 705/67 |
| 2016/0125040 A1 * | 5/2016 | Kheterpal | .............. | G06Q 20/06 707/776 |

(Continued)

*Primary Examiner* — Cheng-Feng Huang

(57) ABSTRACT

A digital ledger built upon a blockchain to provide users with the ability to securely, accurately, and verifiably share state information between distrustful parties is provided herein. The Verifiable Outsourced Ledger is hosted in a networked environment, accessible by multiple parties, and maintains an immutable view of the transactions submitted by authorized parties and a continuous view of the states shared between the parties that the parties can replicate independently locally to verify the integrity of the ledger.

20 Claims, 8 Drawing Sheets

(56) References Cited

U.S. PATENT DOCUMENTS

| | | | |
|---|---|---|---|
| 2016/0330031 A1* | 11/2016 | Drego | H04L 9/3239 |
| 2017/0243193 A1* | 8/2017 | Man | G06Q 20/065 |
| 2017/0279774 A1* | 9/2017 | Booz | G06Q 20/123 |
| 2017/0372392 A1* | 12/2017 | Metnick | G06Q 30/0613 |
| 2018/0006808 A1* | 1/2018 | Suresh | H04L 9/0643 |
| 2018/0062848 A1* | 3/2018 | Gorman | H04L 9/3239 |
| 2018/0063099 A1* | 3/2018 | Versteeg | H04W 12/02 |
| 2019/0208414 A1* | 7/2019 | Roennow | H04W 80/02 |

* cited by examiner

VERIFIABLE OUTSOURCED LEDGERS

CROSS-REFERENCE TO RELATED APPLICATIONS

This application is a continuation application of U.S. patent application Ser. No. 15/280,806 (now U.S. Pat. No. 10,587,628), entitled "VERIFIABLE OUTSOURCED LEDGERS," filed on Sep. 29, 2016, the entire disclosure of which is hereby incorporated herein by reference, in its entirety, for all that it teaches and for all purposes.

BACKGROUND

Parties are increasingly using digital transactions to conduct their affairs. Digital transactions include, but are not limited to: online shopping, transfers of funds, releases of digital assets, the creation and management of "cryptocurrencies", etc. Digital transactions require systems and methods for auditing those transactions and verifying their authenticity so that the parties of the transactions can trust that the transactions occur according to their expectations and that a clear and unambiguous record for those transactions exists. For example, users of a ride hailing application that dynamically prices its services may desire a reliable and tamper-evident log of the prices of services at time of request.

In one example, parties may rely on a trusted (or neutral) third party (or conglomeration of parties) to arbitrate their transactions or audit them after the fact, which requires an additional party to be part of the transaction, for the transacting parties to agree to the third party, and for the third party to periodically demonstrate its ongoing trustworthiness. In another example, parties may rely on a write-only database that maintains entries for transactions for later auditing (e.g., a blockchain), but depending on the database, extremely high read and write latencies are required to avoid fraudulent "double spends" of transactional resources. Unfortunately, due to the high amount of computational resources required to maintain and write to a verifiable write-only database, such as a blockchain, in a secure manner, individual transactions can take a long time to process, and are vulnerable to several attacks (e.g., man-in-the-middle, de-anonymization, selfish mining/forking records, pre-mining/double accounting).

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and hardware aspects of computer readable storage media are provided herein for enabling Verifiable Outsourced Ledgers (VOL). A VOL improves the functionality of the computing devices implementing the present disclosure by providing a digital ledger that mutually distrustful parties can use to share and execute transactions with lower transactional latency, more efficient processing resource expenditures, and higher maximum transactional throughputs than required by other digital ledgers. In one aspect, VOLs are implemented on a cloud service that may be semi-trusted by the parties, reducing the need for the parties to independently verify the trustworthiness of the hosting entity as the parties may each independently verify the authenticity and reliability of the VOL.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
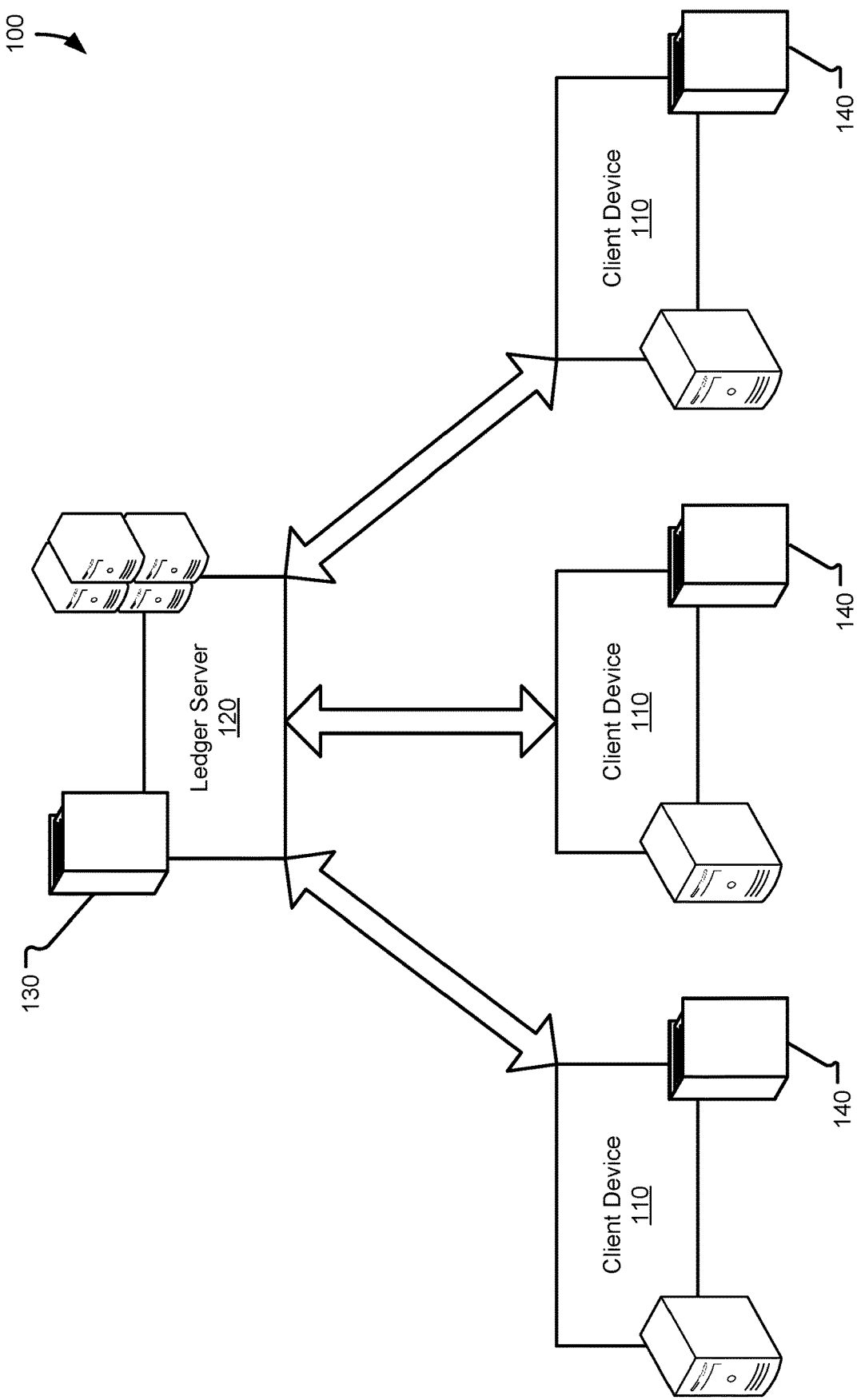
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and hardware aspects of computer readable storage media are provided herein for enabling ledgers that are accessible in a networked environment that multiple (and potentially distrustful) entities may access to share state information. The present disclosure improves the functionality of the computing devices implementing it by removing intermediary parties from the transactions, thus lowering transactional latency, allowing a blockchain to be executed in a cloud environment, which allows for a more efficient allocation of processing resources and higher maximum transactional throughputs than required by other digital ledgers. As will be appreciated, digital ledgers may provide myriad types of state machines and handle innumerable transaction types; the use scenarios provided herein are therefore understood to present non-limiting examples.

FIG. 1 illustrates an example environment 100 in which the present disclosure may be practiced. As illustrated, one or more client devices 110 are in communication with a ledger server 120 that hosts a Verifiable Outsourced Ledger (VOL 130). Although a given number of client devices 110, ledger servers 120, and VOLs 130 are shown in the example environment 100, one of ordinary skill in the art will appreciate that more or fewer of each component may be present in different aspects.

Each of the client device 110 and ledger server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 5, 6A, 6B, and 7. Client devices 110 are operated by users, who may be humans or automated systems (e.g., "bots"). In various aspects, the client device 110, and ledger server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The client devices 110 are in communication with the ledger server 120 to report transactions to be recorded in a particular VOL 130. In various aspects, the client devices 110 may be on-premises computing devices or may be provided as virtual machines as part of a cloud service, which may be the same or a different cloud service than that used to provide the ledger server 120 in aspects where the ledger server 120 is provided as a cloud service to various clients.

The client devices 110 are operable to maintain local copies 140 of the VOLs 130 that are maintained on and shared between multiple client devices 110 by the ledger server 120 to audit and track the state of the VOLs 130. The local copies 140 provide the clients, who may actively distrust the other clients or the service provider, or who wish to "trust, but verify" that the other clients or the service provider are not manipulating the state machine maintained by the VOL 130 for their own gain. The client devices 110 may request or query for the current state of a state machine (or an encrypted value thereof) maintained in the VOL 130, some or all of the transactions submitted to affect the state machine, and metrics related to the VOL 130 (e.g., frequency of transaction submissions, number of transactions, client identities) to verify whether the shared VOL 130 maintained on the ledger server 120 matches the client's view of the VOL 130 maintained locally on the client device 110 as the local copy 140. In various aspects, the local copy 140 may mirror the VOL 130 maintained on the ledger server 120, may mirror a previous state of the VOL 130 (e.g., when the client has not been provided with the most recent transactions affecting the VOL 130), or may be a reduced-size version of the VOL 130. For example, a client may be interested in learning of a state maintained by the VOL 130, but not auditing the VOL 130, and therefore a reduced-size local copy 140 of the VOL 130 provides the state information, but not a list of transactions.

The ledger server 120 is operable to maintain multiple VOLs 130 for use by multiple sets of clients. The ledger server 120 maintains one or more VOLs 130, and may be part of a public cloud service, a private cloud service, or dedicated device run by a VOL provider. The clients use one or more client devices 110 to submit transactions to the ledger server 120, which identify: the party initiating the transaction, the VOL 130 in which the transaction is to be recorded, the effect of the transaction, and the identity of any recipient parties of the transaction. Clients (as initiators or recipients of a transaction) are identified via a public key of a public/private key pair associated the client. The ledger server 120 maintains the public keys for the associated clients that access the VOLs 130 that are hosted by the ledger server 120. The client devices 110 securely maintain the private keys of their associated clients, and use the private keys to sign transactions, which the ledger server 120 is operable to verify based on the associated public key. One of ordinary skill in the art will be familiar with public/private key cryptography and digital signatures.

The ledger server 120 is operated by a service provider that provides clients with a transparent, verifiable, and portable digital ledger by which to share state information—the VOL 130. The ledger server 120 stores the state information in the VOL 130 in an encrypted and traceable format via a blockchain 200 (discussed in greater detail in regard to FIG. 2) and the transactions that the clients submit to the VOL 130 so that the clients may monitor the VOL 130 for unexpected behaviors and transport the VOL 130 in a last-known-good state to a different ledger server 120 when it is suspected that the VOL 130 has been manipulated or compromised.

Each VOL 130 is operable to maintain a secure record of the transactions that clients conduct. In various aspects, the transactions specify that one or more states maintained by the VOL 130 are to be changed. In one example, a first client device 110 signals that a first client is initiating a transfer of funds to a second client that is to be recorded in a first VOL 130 as a change of states in account balances. In another example, a second client device 110 signals that a third client is recording a bid for an auction as a transaction that is to be recorded in a second VOL 130 as a change in state of a record. In a further example, a third client device 110 signals that input (e.g., text entry, a button click) is to be made to affect the state of program whose state machine is maintained in a third VOL 130.

Figure 2:
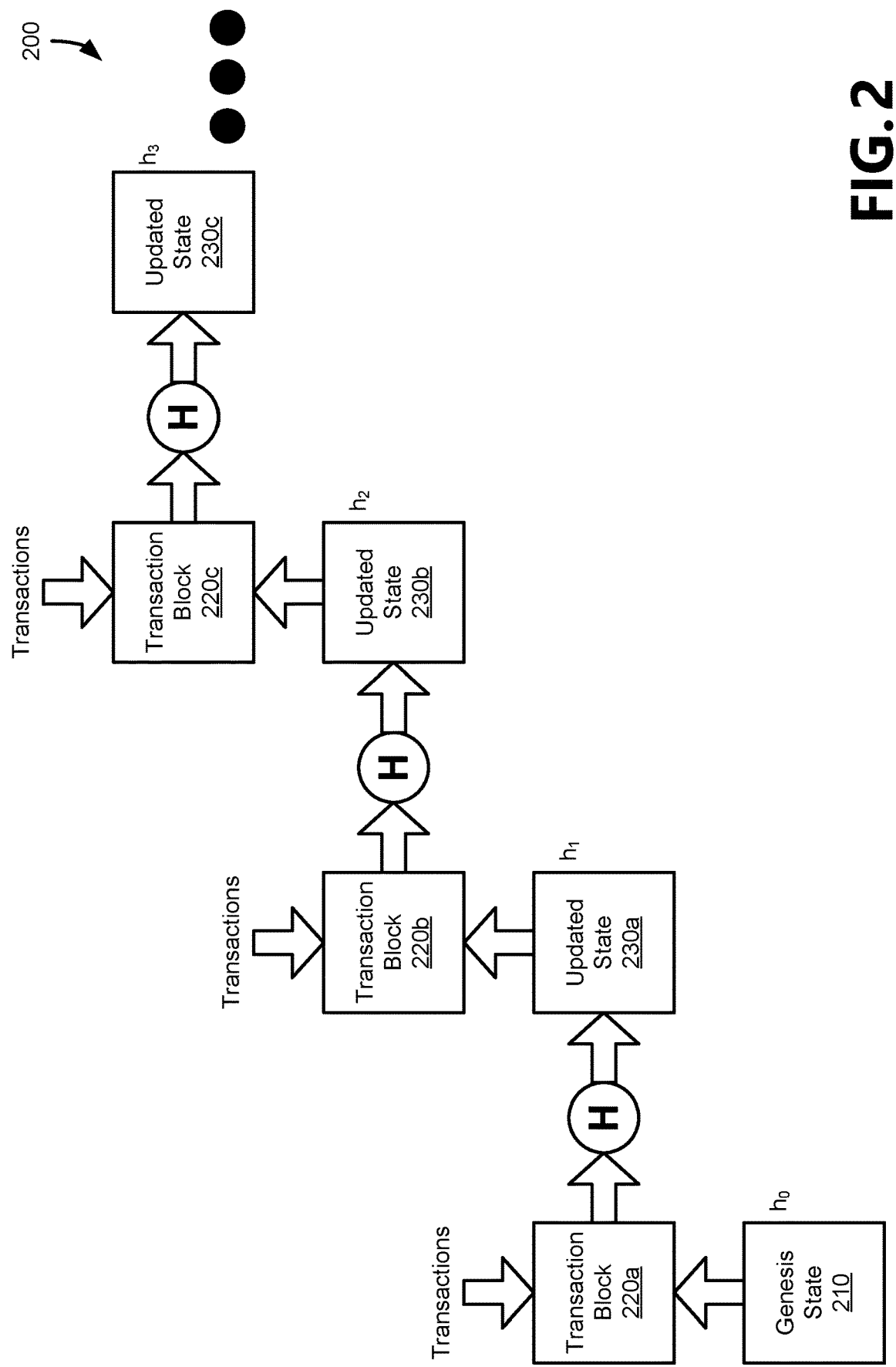
FIG. 2 illustrates an example blockchain.

FIG. 2 illustrates an example blockchain 200. As will be appreciated, a blockchain 200 maintains the series of transactions made by the parties that affect a previous state of the blockchain 200 in an encrypted and traceable format. The blockchain 200 provides clients the ability to access a sequential record of all transactions submitted to the VOL 130. The blockchain 200 supports requests for various views and queries to support calculations and verification of its accuracy to highlight the ordering of transactions and the results of the latest transactions.

As illustrated, the initial state of the blockchain 200 is represented by genesis state 210. The genesis state 210 is available to each client that has access to the blockchain 200. A client who has access to the genesis state 210, knows the hashing algorithm used to construct the blockchain 200, and the ordered list of transactions maintained by the VOL 130 is enabled to reconstruct the tail value (i.e., the associated updated state 230 for a given "height" in transaction blocks 220 added) of the blockchain 200 at any point in the history of the blockchain 200. The genesis state 210 initializes the blockchain 200 based on a hash of a seed block of data and a digital signature for the VOL 130. In various aspects, the seed block may be a value that the parties using the VOL 130 agree upon, such as, for example: a shared secret, such as, for example, the initial balances of each client's respective account being tracked by the VOL 130; a final or given state of another VOL 130; a nonce, such as, for example, a timestamp; or an identifier for the VOL 130. In various aspects, the digital signature of the hashed seed block uses a signature key (e.g., a private key for the VOL 130 or the ledger server 120 maintaining the VOL 130).

Each time that a client submits a transaction to the ledger server 120 to affect a VOL 130, the transaction is organized into a transaction block 220 for addition to the blockchain 200. In various aspects, several transactions are received that are organized into a single transaction block 220 based on a size (in bits) of the transactions (e.g., at least X bits, no more than Y bits, at least X bits but no more than Y bits), a timeframe in which the transactions are received (e.g., a Z second time window), or combinations of sizes and timeframes. In another aspect, a large transaction (i.e., a transaction that exceeds a maximum bit size allowed by a hash function for the blockchain 200) is broken into multiple transaction blocks 220. The current state of the blockchain 200 is incorporated into the transaction block 220 as a cryptographic pointer for the state of the blockchain 200 (e.g., a cryptographic hash of the previous state of the blockchain). The transaction block 220 is then hashed to produce an updated state 230 as the tail-value for the blockchain 200. The size of the blockchain 200 thus remains constant in memory regardless of the number of transaction blocks 220 that are maintained therein; the output size of the hash function used to append transaction blocks 220 to the blockchain 200 determines the size of the blockchain 200 in memory storage. In various aspects, the memory storage maintains each VOL 130 as an identifier, a current state of the blockchain 200, and a previous state of the blockchain 200.

Various hashing algorithms may be used to advance the state of the blockchain 200 as new transactions are received from clients. A hashing algorithm (also referred to as a "hash function") yields a one-way encryption of data, which may be achieved according to various algorithms known to those of ordinary skill in the art (SHA-2, SHA256, MD5, BLAKE2, Keccak, GOST, etc.). In various aspects, the transaction blocks 220 includes additional information about itself related to: identifying a version of the hash construction rules, a signature or checksum for the transaction block 220, a timestamp or a height of the blockchain 200 at the time the transaction block 220 is recorded, etc.

As each transaction block 220 is added to the records stored within the blockchain 200, the "height" of the blockchain 200 is incremented. For example, at an initial state (i.e., when the genesis state 210 is the tail value), the blockchain 200 will have a height of zero ($h_0$); after a first transaction block 220a is appended, the blockchain 200 will have a height of one ($h_1$); after a second transaction block 220b is appended, the blockchain 200 will have a height of two ($h_2$); after a third transaction block 220c is appended, the blockchain 200 will have a height of three ($h_3$); etc.

The VOL 130 is queryable for its tail value (i.e., the state having the greatest height in the blockchain 200), the internal blocks (e.g., previous tail values), as well as properties related to metadata related to the use and maintenance of the blockchain 200. Such metadata include, but are not limited to: a current height of the blockchain 200, clients associated with the blockchain 200, a number of transactions from one or more given clients, a frequency of transaction from one or more given clients, a level of consensus from the clients regarding the state of the blockchain 200 (e.g., X of Y clients agree that the tail value or height of the blockchain 200 is equal to Z), etc.

Figure 3:
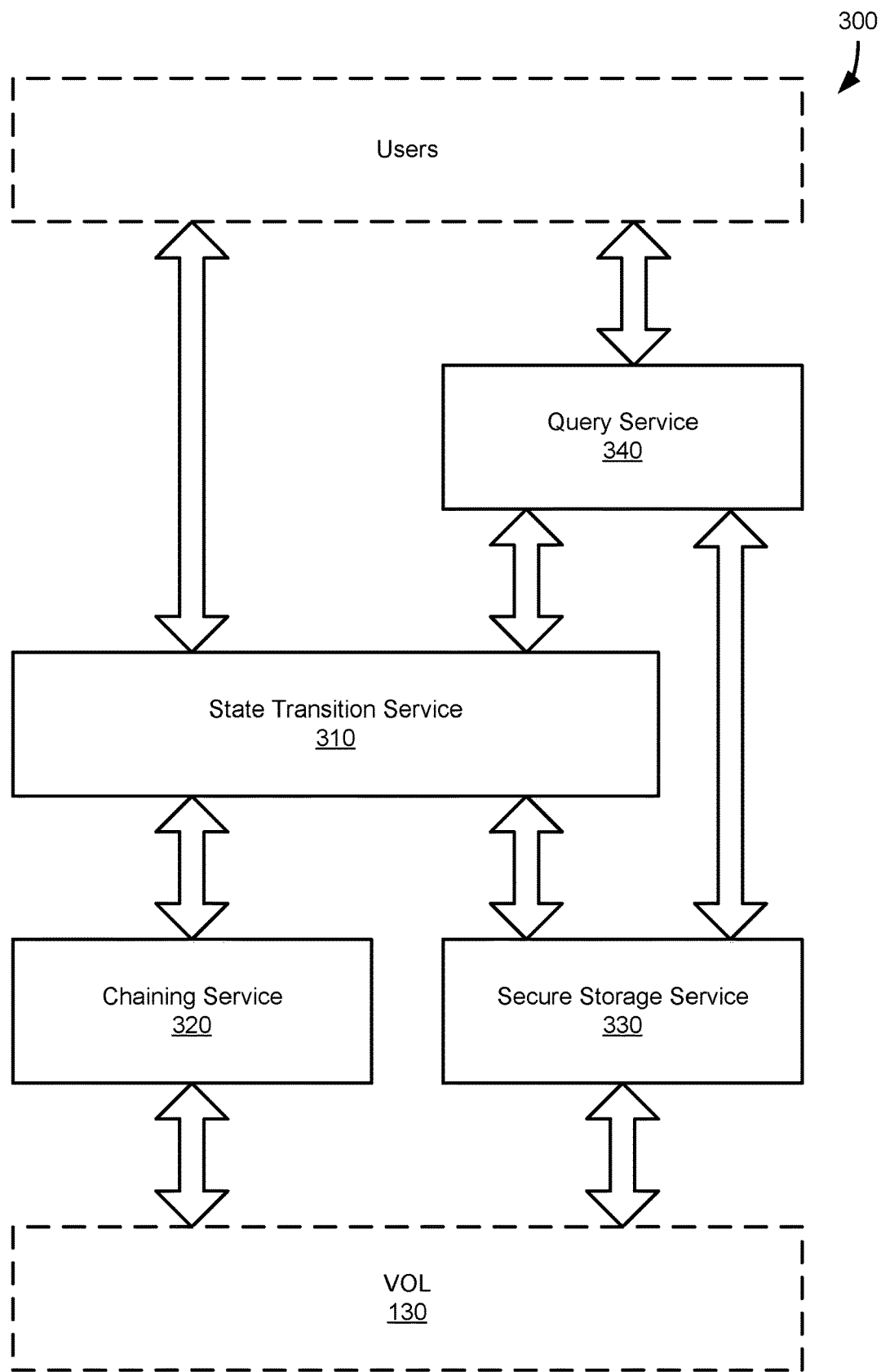
FIG. 3 illustrates a service architecture of the ledger server.

To manage the blockchain 200 and allow for the querying and verification thereof by clients, the ledger server 120 provides several components with different interfaces by which to interact with the blockchain 200, which are discussed in relation to FIG. 3. FIG. 3 illustrates a service architecture 300 of the ledger server 120 that provides a state transition service 310, a chaining service 320, a secure storage service 330, and a query service 340 to interact with the blockchains 200 and provide the VOL 130 to the clients. In various aspects, each of the state transition service 310, the chaining service 320, the secure storage service 330, and the query service 340 may be provided as Application Program Interfaces (APIs) that are callable by one or more computing devices, or may be dedicated hardware components operable to perform the operations specified.

The state transition service 310 forms the transaction blocks 220 that are hashed to provide the blockchain 200. The state transition service 310 receives transactions, from the client devices 110 and from the ledger server 120, serializes those transactions and embeds the tail-end value of the current state of the blockchain 200 into the transaction block. In various aspects, the state transition service 310 receives the transactions from a query service 340 or directly from the users. The transaction block 220 is stored by the state transition service 310 with the secure storage service 330 to receive a receipt. The state transition service 310 signals the chaining service to append the transaction block 220 to the blockchain 200, and implements the commands present in the transactions included in the transaction block 220 to update the state of the VOL 130. The state transition service 310 is in communication with the chaining service 320 and the secure storage service 330 and allows them to share data.

The chaining service 320 enables the initialization of the blockchain 200 and the incrementation of the blockchain 200. In various aspects, an initialization function provided by the chaining service 320 creates a genesis block 210 and a digital signature of the genesis block 210 from inputs of a hashed value of a block (e.g., a seed block) and a receipt received from the secure storage service 330. When initializing a blockchain 200 for a VOL 130, the chaining service 320 is provided with an identifier for the VOL 130 so that transactions and queries from clients can be directed to the appropriate blockchain 200. The chaining service 320 maintains a state for each VOL 130 managed by the chaining service 320 that provides the identifier for each VOL 130, the value of the current state of the blockchain 200, and the value of the previous state of the blockchain 200.

In additional aspects, an APPEND function provided by the chaining service increments the blockchain 200 (e.g., moving from $h_0$ to $h_1$, $h_1$ to $h_2$, etc.) when a transaction block 220 is provided, to produce an updated state 230 as a new tail for the blockchain 200 and a digital signature of the updated state 230. In one aspect, the chaining service 320 provides an APPEND function that accepts an identifier for a VOL 130 whose blockchain 200 is to be updated, a hashed transaction block 220, a receipt for the current transaction block 220, and a receipt for the previous transaction block 220 as inputs and provides an updated state 230 and a digital signature of the updated state 230 as outputs. In various aspects, the updated state 230 and digital signatures are stored on hardware memory (at the client device 110 or the ledger server 120) along with the previous states and digital signatures, while in other aspects the updated states 230 and digital signatures overwrite prior values for a given VOL 130. The chaining service 320 signs a new updated state 230 and adds it to the blockchain 200 such that the new updated state 230 cryptographically extends the blockchain 200 from the previous state.

A secure storage service 330 enables the client devices 110 and ledger server 120 to add to the blockchain 200, retrieve states from the blockchain 200, and create receipts for transactions made to the blockchain 200. In one aspect, the secure storage service 330 provides a PUT function that accepts a transaction block 220 as an input and provides a hashed value of that transaction block 220 and a receipt for that hashed value as outputs, which are used as inputs by the chaining service 320, such as, for example, in the APPEND function discussed above. The receipt produced by aspects of the PUT function is a digital signature of the hashed value produced by the PUT function. In another aspect, the secure storage service 330 provides a GET function that accepts an inquiry value and returns the transaction block 220 that would have yielded the inquiry value if a user had previously called PUT with the inquiry value. In a further aspect, the secure storage service 330 stores the transactions received from the mutually distrustful parties (or the transaction blocks 220) in the VOL 130 in the order in which those transactions affect the state machine maintained in the VOL 130.

The query service 340 is operable to handle general queries about the state of the VOL 130 and transactions made thereto. In one aspect, the VOL 130 maintains the tail value of the blockchain 200 (i.e., the state with the greatest height) as well as all of the transactions issued to the VOL 130 to provide an auditable chain to the clients. The query service 340 allows clients to request the highest height value from the blockchain 200, individual commands stored in the VOL 130, as well as metadata related to the VOL 130 (e.g., a current height of the blockchain 200, clients associated with the blockchain 200, a number of transactions from one or more given clients, a frequency of transaction from one or more given clients, a level of consensus from the clients regarding the state of the blockchain 200).

Because the VOL 130 is accessible in a networked environment, the query service 340 is operable to determine whether the requesting user has access to read from or write to the VOL 130 identified in a given query or request before that query or request is implemented on the VOL 130. In various aspects, the query service 340 is operable to use certificates, login tokens, digital signatures (e.g., signing with a public/private key pair), known IP or MAC addresses, and the like to verify whether a given user has permission to access a given VOL 130. In response to determining that a given user is not recognized or otherwise lacks permissions, the query service 340 is operable to request authorization credentials from the user (e.g., to prompt a login) or to inform the user that access has been denied. In response to recognizing the user and the user having the appropriate permissions, the query service 340 is operable to execute the query or request made from the given user. As will be appreciated, the queries or requests (or their containers, such as TCP/IP datagrams) may include the identifying information for the requesting users in addition to or separately from the arguments of the queries and requests.

In one aspect, the query service handles a SYNC request received from the client devices 110 or ledger server 120 to download data stored in the VOL 130 when requested by an authorized user. In one aspect, the SYNC request includes: an identifier for a VOL 130; a continuation token, identifying a height in the blockchain 200 from which data or metadata are requested; and a request type identifier.

For example, a client using a client device 110 with limited processing resources or bandwidth availability may request, via a SYNC request, for the query service 340 to return metadata of the value of the tail end of the blockchain 200. The SYNC request in this example includes the identifier for the specific VOL 130 the client is interested in, a continuation token that specifies the metadata stored at the maximum height of the blockchain 200 is of interest, and a request type that specifies that the tail end value is of interest.

In another example, a client device 110 with greater processing resources or bandwidth availability than in the previous example may request, via a SYNC request, the transactions and the current state of the blockchain 200 (e.g., to audit whether the state machine maintained in the VOL 130 matches the client's expectations). The SYNC request in this example includes the identifier for the specific VOL 130 the client is interested in, a continuation token that specifies the last height of the blockchain 200 that the client has previously seen, and a request type that specifies that the transactions and the tail end value are of interest and are to be returned to the client device 110.

In another aspect, the query services 340 handle a SEND request received from the client devices 110 or ledger server 120, to add a transaction to the VOL 130 when requested by an authorized user. In one aspect, the SEND request includes: an identifier for the VOL 130 in which the transaction is to be tracked, and a command that the state machine maintained by the VOL 130 can interpret. For example, where a SEND request from a first bank transferring funds to a second back in which the transfer is tracked in a first VOL 130, the SEND request includes as its arguments an identifier for the first VOL 130 and a command that specifies the account numbers, amounts, timings, etc. needed to effectuate a balance transfer in the state machine maintained in the VOL 130. As will be appreciated, depending on the state machine maintained in the VOL 130, the commands may take various forms suited or formatted to the implementation of the VOL 130, including, but not limited to: images, signed/encrypted requests, plaintext command lines, etc.

Figure 4:
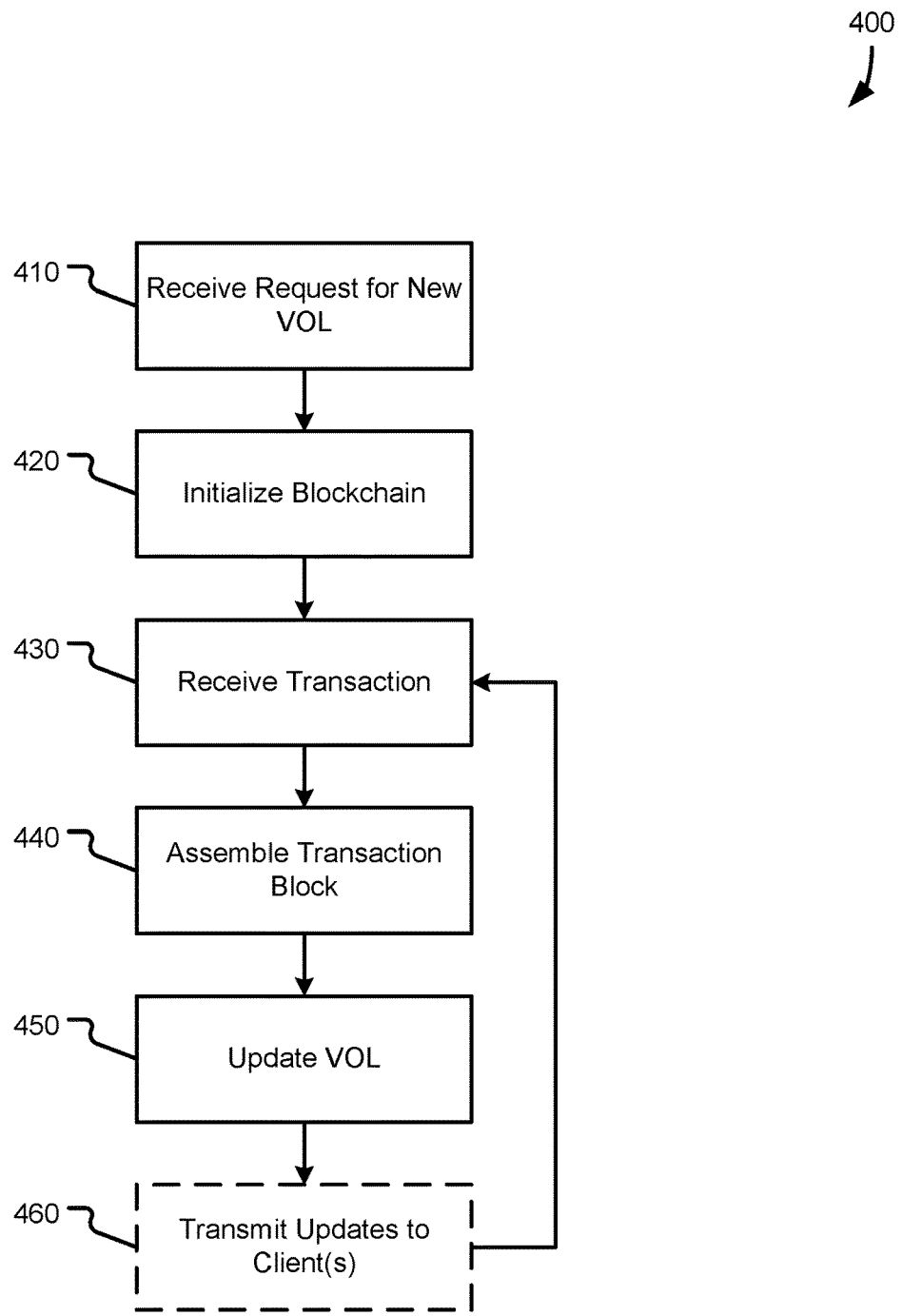
FIG. 4 is a flow chart showing general stages involved in an example method for creating and maintaining a Verifiable Outsourced Ledger.

FIG. 4 is a flow chart showing general stages involved in an example method 400 for creating and maintaining a VOL 130. Systems that make use of VOLs 130 improve their functionality in being able to track and share state information between multiple parties that may distrust one another with improved speed and accuracy in record keeping, reductions in latency and the number of parties needed to audit the records maintained in the state information, and provide an immutable auditable record that may be freely transferred to different computing devices and service providers to manage.

Method 400 begins at OPERATION 410, where a request for a new VOL 130 is received by a ledger server 120. In various aspects, the request may include identifiers for parties with permission to read from or write to the VOL 130 or criteria by which additional parties may be added and verified as having permission to read from or write to the VOL 130. The ledger server 120 is operable to receive a seed value in the request for a new VOL 130, request a seed value in response to receiving the request that does not include a seed value, or supply its own seed value (e.g., a nonce). The request may also optionally include an identity of the hash function to be used to assemble the blockchain 200, a lifetime for how long the VOL 130 is to remain active and accept additional transactions (including whether the VOL 130 is to be archived or deleted at the end of its lifetime), or failure procedures for how to handle the VOL 130 in the event that a given number of clients disagree over the state of the VOL 130.

Proceeding to OPERATION 420, the blockchain 200 is initialized for the VOL 130. In various aspects, the seed value is hashed according to the hash function to produce a genesis state 210. The blockchain 200 maintains a state value based on the genesis state 210 and the transactions that the authorized clients submit for tracking in the VOL 130. The VOL 130 maintains the blockchain and the transactions as an immutable record of the state machine that can be queried and audited by the users. Method 400 is operable to loop through OPERATIONS 430-460 for as long as the VOL 130 remains active.

At OPERATION 430 a transaction is received that is to be tracked in the VOL 130. The transaction may be received from a client device 110 (e.g., a command or request to affect the state maintained in the blockchain 200 made by a client) or may be received internally by the ledger server 120 (e.g., a station keeping transaction). In various aspects, the transactions include actions that will affect that state of the state machine maintained in the VOL 130, but in additional aspects queries made to the VOL 130 that do not affect the state of the state machine maintained in the VOL 130 may also be included as transactions. For example, where a VOL 130 maintains the states of various bank accounts, a first client who submits a balance transfer request, and a second client who submits a balance inquiry request may each have their requests treated as transactions. In another example, requests (both those that do and those that do not affect the state shared via the VOL 130) may be tracked in various categories to provide additional metadata about the use and the patterns of use of one or more VOLs 130.

As part of OPERATION 430, the ledger server 120 verifies whether the party that submitted the transaction is authorized to read from or write to the identified VOL 130. In various aspects, the ledger server 120 is operable to determine whether a request is from an authorized user based on the request being digitally signed, transmitted with an authorization token, the communication session being initiated with an authenticating handshake, the request coming from a known-good address, etc. The ledger server 120 may ignore requests from unauthorized users or may track requests sent from unauthorized users for security purposes.

In additional aspects, an authorized user also presents a user receipt, (a digital signature of a state of the blockchain 200 as it is known to the user) with the transaction to be stored in the VOL 130. The ledger server 120 is operable to use the user receipt to determine whether the user's view of the VOL 130 is up-to-date. When it is determined that the user receipt is valid, and the user's view of the state machine maintained by the VOL 130 is up-to-date, the transactions will be handled by the ledger server 120. In various aspects, each client is provided with a digital signature of the updated state 230 when the blockchain 200 increments in height, but as will be appreciated, legitimate clients may not always have the digital signature of the most-recent updated state 230. (e.g., due to network transmission errors, a client device 110 being shutdown, cross transmission of receipts and transactions). Therefore, the transactions include or are transmitted in association with a user receipt to ensure that the transactions requested can be made on the state machine as it exists in the VOL 130. For example, a client with an outdated view of a bank account maintained by a VOL 130 may be prevented from overdrawing from that account by the ledger server 120 refusing to implement the transactions when an out-of-date or otherwise invalid user receipt is received. When it is determined that the user receipt is invalid, and the user's view of the state machine maintained by the VOL 130 is not up-to-date, the transactions will be ignored by the ledger server 120, and the user may optionally be transmitted an error message indicating that the transaction failed due to an invalid user receipt.

The transaction block 220 is assembled at OPERATION 440. One or more transactions that are to be tracked in the VOL 130 are assembled into a block that includes the current state maintained by the blockchain 200. The size of the transaction blocks 220 depends on the hash function used to maintain the blockchain 200, and depending on the size of a transaction, one or more transactions may be included in a single transaction block 220 or a single transaction may be split across multiple transaction blocks 220. These transaction blocks 220 are stored in secure storage to maintain a record of the transactions tracked by the VOL 130. When a given transaction block 220 is stored, a receipt for the given transaction block 220 is generated as digital signature of the hashed value of the given transaction block 220. In various aspects, the digital signature is generated via a signing key that is unique to the VOL 130 in which the transaction block 220 is stored.

Proceeding to OPERATION 450, the VOL 130 is updated to implement any commands present in the transactions included in the transaction block 220 on the state machine maintained in the VOL 130, increment the blockchain 200 to the hashed value of the transaction block 220, and append the transaction block 220 to the list of previous transaction blocks 220 handled by the VOL 130. In various aspects, the ledger server 120 verifies that the hash of the transaction block 220 maintains a linear record of the transactions affecting the state machine maintained in the VOL 130 by determining whether a receipt associated with the current state matches the receipt that the updated state 230

At optional OPERATION 460 the updates to the VOL 130 are transmitted to the client(s). In some aspects, the updates to the VOL 130 may be sent to the clients periodically or in response to a request from the client. In one example, the client receives the receipt generated in response to the transaction block 220 to be stored in the VOL 130. In another example, a client receives the updated state 230 and the associated transaction block 230 every n seconds/hours/days. In a further example, the client device 110 may transmit a request for an updated state 230, some or all of the information stored in the VOL 130 (e.g., a range of transaction blocks 220), or metrics related to the VOL 130, which the ledger server 120 will respond to by transmitting the requested information to the client device 110 when the client associated with the client device 110 is authorized to receive that information.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

At optional OPERATION 460 the updates to the VOL 130 are transmitted to the client(s). In some aspects, the updates to the VOL 130 may be sent to the clients periodically or in response to a request from the client. In one example, the client receives the receipt generated in response to the transaction block 220 to be stored in the VOL 130. In another example, a client receives the updated state 230 and the associated transaction block 220 every n seconds/hours/ days. In a further example, the client device 110 may transmit a request for an updated state 230, some or all of the information stored in the VOL 130 (e.g., a range of transaction blocks 220), or metrics related to the VOL 130, which the ledger server 120 will respond to by transmitting the requested information to the client device 110 when the client associated with the client device 110 is authorized to receive that information.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
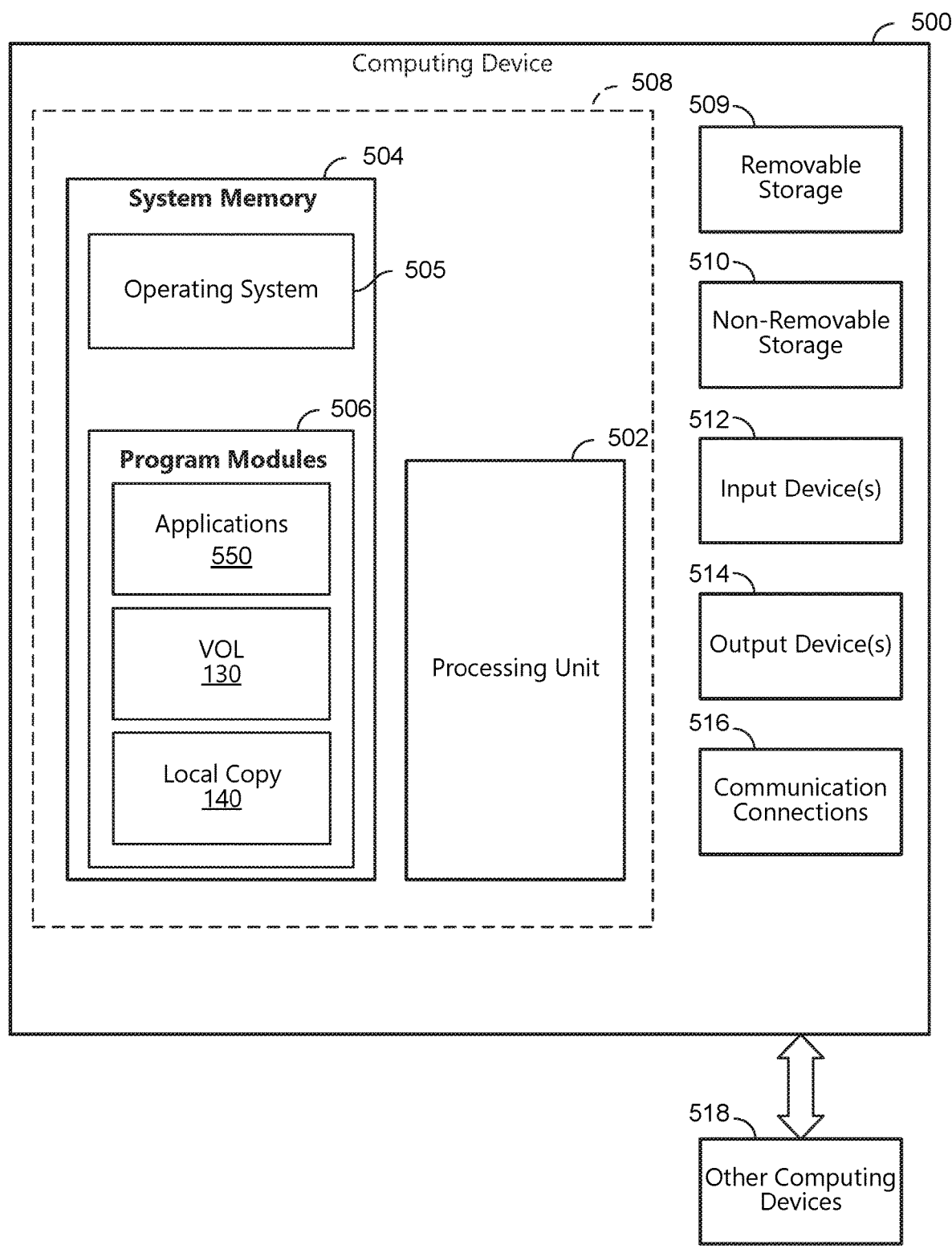
FIG. 5 is a block diagram illustrating example physical components of a computing device.
Figure 6A:
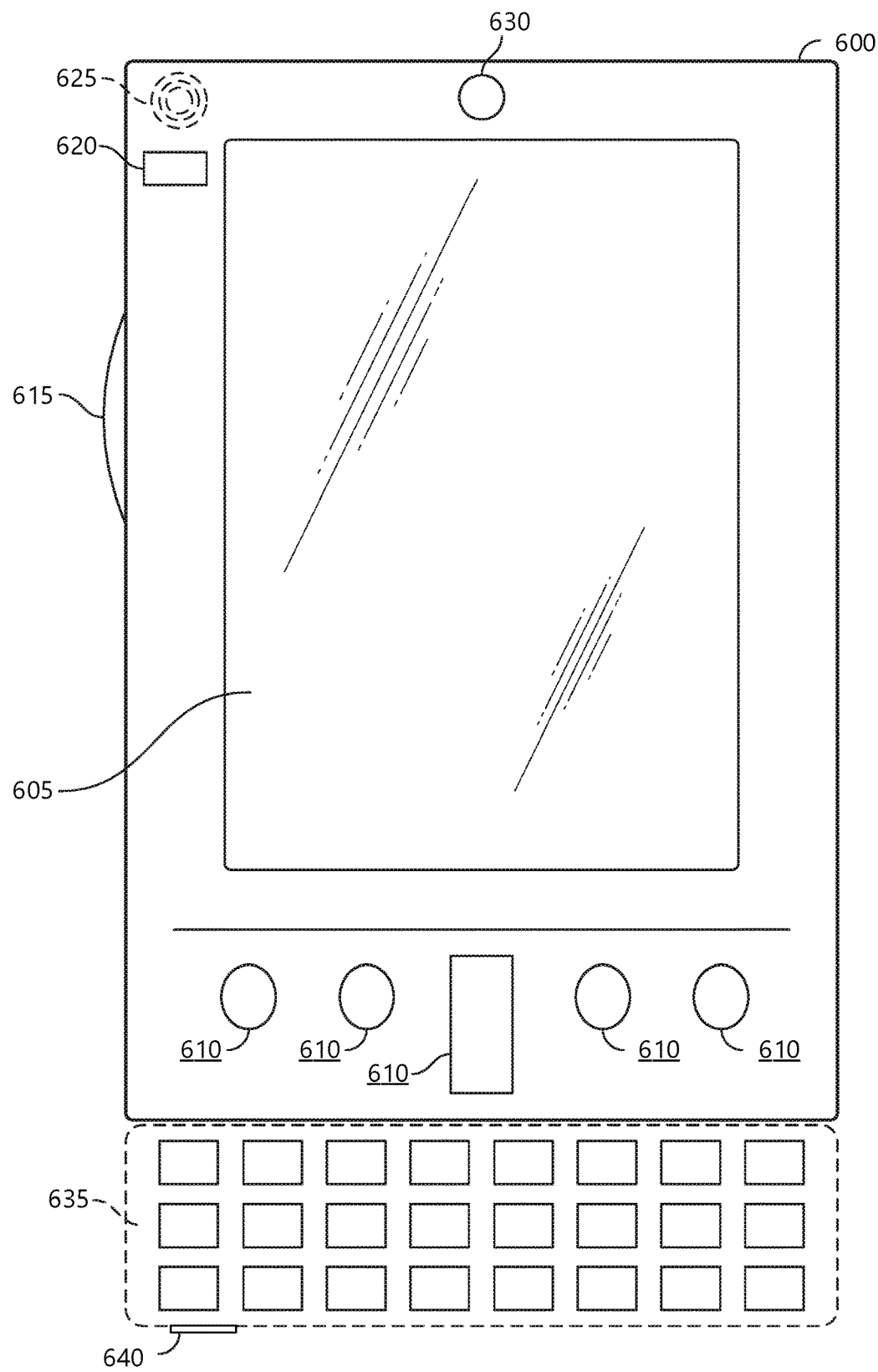
FIGS. 6A and 6B are block diagrams of a mobile computing device.
Figure 6B:
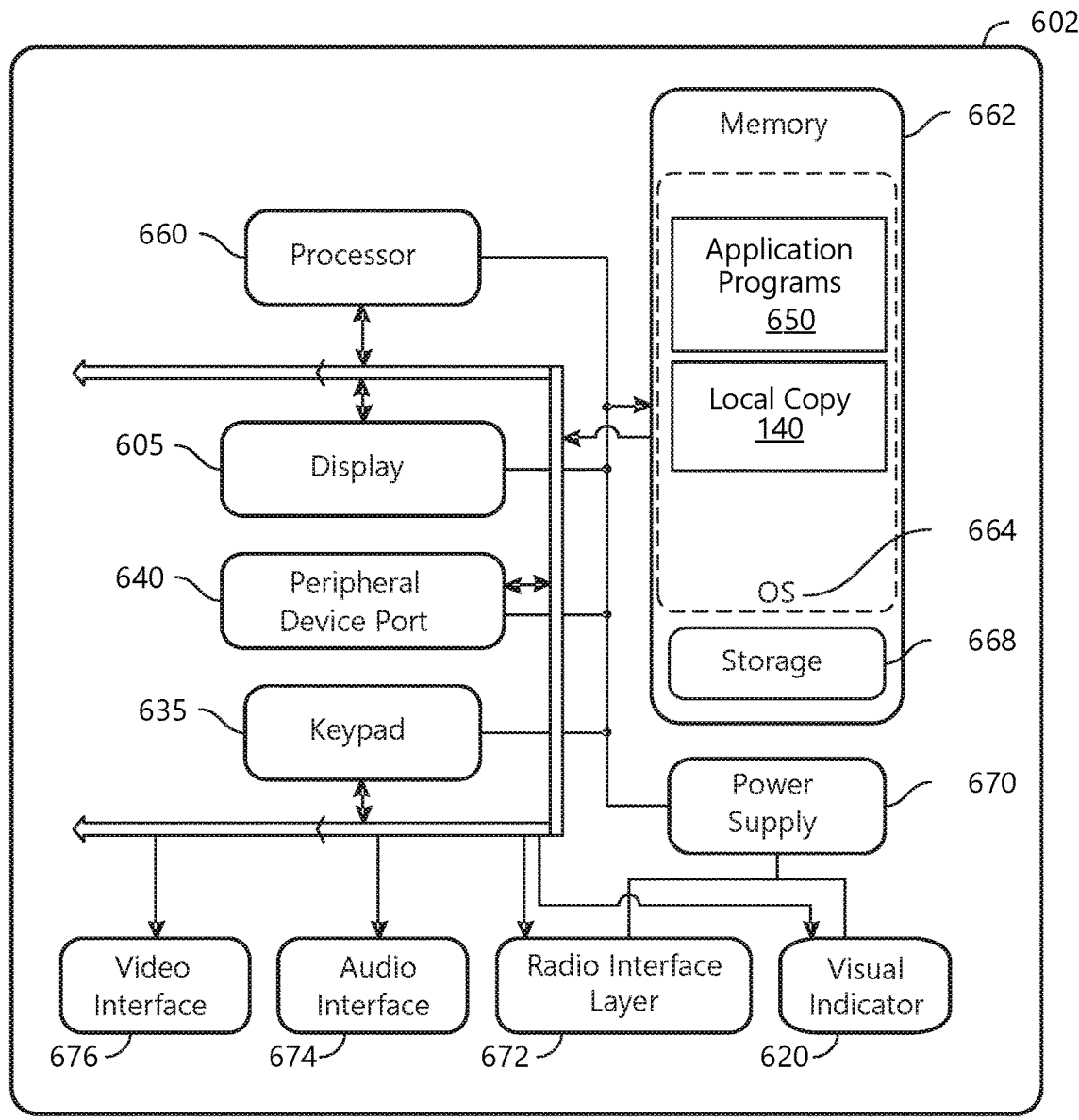
Figure 7:
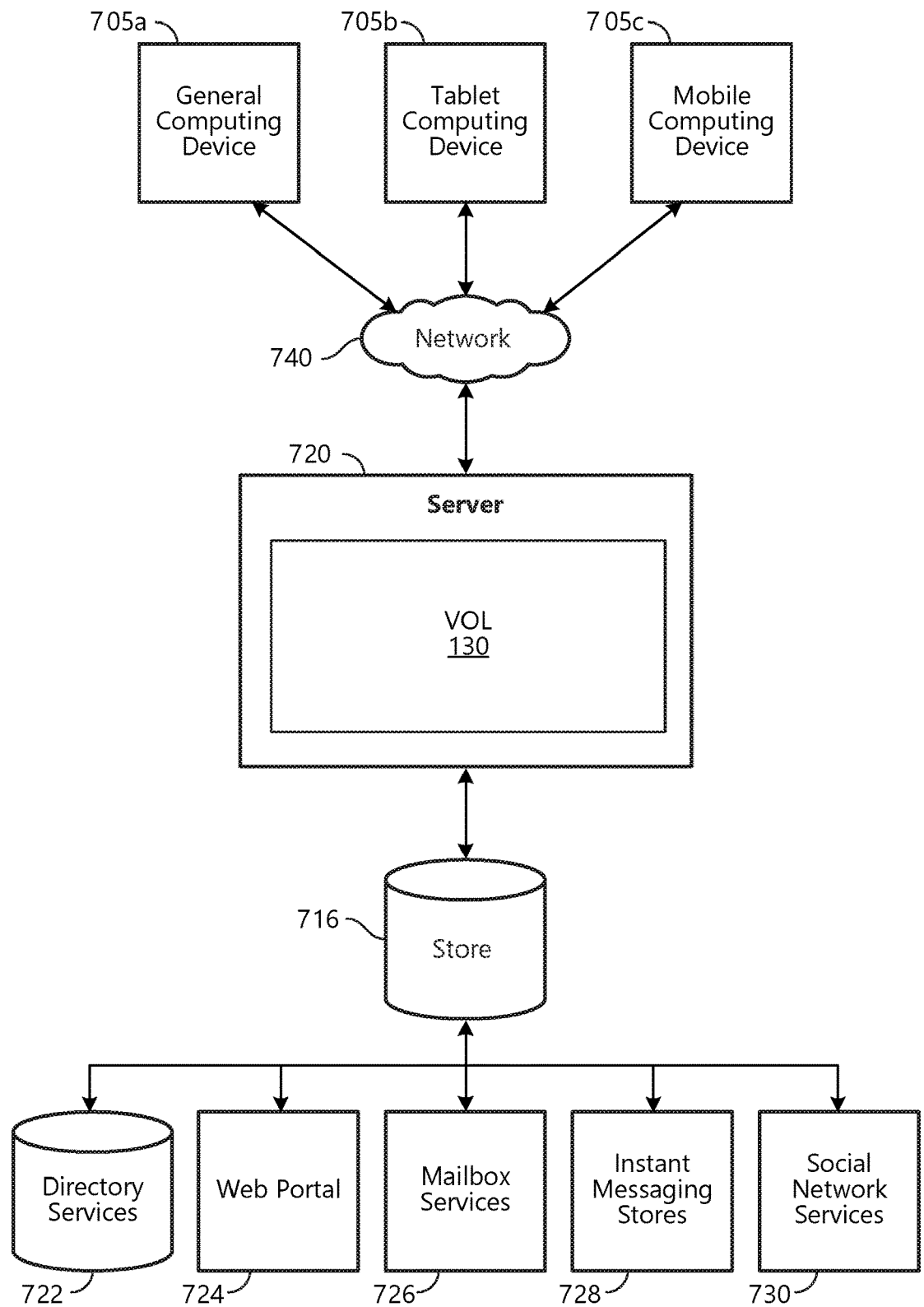
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes VOLs 130, local copies 140 thereof, and applications running within VOLs 130. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., VOL 130 or local copy 140) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, a local copy 140 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for sharing state data between mutually distrustful parties as described above. Content developed, interacted with, or edited in association with the VOL 130 is enabled to be stored in different communication channels or other storage types. For example, various documents may be stored using a directory service 722, a web portal 724, a mailbox service 726, an instant messaging store 728, or a social networking site 730. The VOL 130 is operative to use any of these types of systems or the like for sharing state data between mutually distrustful parties, as described herein. According to an aspect, a server 720 provides the VOL 130 to clients 705*a,b,c*. As one example, the server 720 is a web server providing the VOL 130 over the web. The server 720 provides the VOL 130 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method comprising:
   receiving a request from a first party of mutually distrustful parties, the request including:
   an identifier for a digital ledger maintaining state data that records previous transactions of the mutually distrustful parties;
   a transaction to conduct and record within the digital ledger; and
   a user receipt for a state of the digital ledger known to the first party, wherein the user receipt is compared to a current state of the digital ledger, the current state of the digital ledger representing the previous transactions of the mutually distrustful parties;
   in response to comparing the user receipt to the current state of the digital ledger, determining the first party has an up-to-date view of the digital ledger based on at least one of:
   a current height of the blockchain;
   a frequency of the previous transactions of the mutually distrustful parties; or
   a number of the previous transactions of the mutually distrustful parties;
   conducting the transaction associated with the request;
   based on the conducted transaction, assembling a new transaction block, the new transaction block including the conducted transaction and the current state of the digital ledger;
   using a cryptographic function to compute an updated state of the digital ledger based on the new transaction block;
   digitally signing the updated state to produce a new user receipt; and
   transmitting the new user receipt to at least the first party.

2. The method of claim 1, wherein the digital ledger is accessible to the mutually distrustful parties via a cloud service provider.

3. The method of claim 1, further comprising:
   comparing the user receipt to a digital signature of the current state; and
   in response to the user receipt not matching the digital signature, rejecting the transaction.

4. The method of claim 1, further comprising:
   determining whether the first party is authorized to affect the digital ledger based on an identity of the first party, wherein the identity of the first party is based on at least one of:
   the request being digitally signed by a public key associated with the first party;
   an IP address from which the request was received being associated with the first party; or
   the request including an access token identifying the first party.

5. The method of claim 1, wherein digitally signing the updated state uses a signing key associated with the digital ledger.

6. The method of claim 1, further comprising:
   receiving a query for the current state of the state data from the first party; and
   transmitting the current state to the first party.

7. The method of claim 1, further comprising:
   receiving a query for one or more transactions stored in the digital ledger from the first party; and
   transmitting the one or more transactions to the first party.

8. The method of claim 7, wherein the query for the one or more transactions includes a continuation token, the continuation token identifying a range in the digital ledger from which the one or more transactions are selected for transmission to the first party.

9. The method of claim 1, wherein the new transaction block includes more than one transaction.

10. A system for sharing state data between mutually distrustful parties, the system comprising:
a processor;
a memory storage device including instructions, which when executed by the processor provide a verifiable outsourced ledger (VOL) including:
a state machine maintaining the state data;
a chaining service operable to receive transactions from the mutually distrustful parties and store the received transactions in a sequential order of effect on the state machine;
a blockchain providing a hashed value of a transaction block, the transaction block including:
transactions previously conducted;
a prior hashed value provided by the blockchain; and
a secure storage service, operable to:
store the transactions in the VOL according to a sequential order of effect;
digitally sign the hashed value to produce a receipt; and
transmit the receipt to the mutually distrustful parties in response to the transaction block being hashed, wherein:
the receipt is compared to a current state of the VOL as known to a requesting party to determine whether the requesting party has an up-to-date view of the VOL, the current state being verifiable based on at least one of:
a current height of the blockchain;
a frequency of the transactions previously conducted; or
a number of the transactions previously conducted;
when the current state is verified, a transaction associated with a request of the requesting party is conducted; and
the conducted transaction is used to assemble a new transaction block to be stored by the VOL.

11. The system of claim 10, wherein the secure storage service is further operable to:
receive a query from a client for a prior transaction block, the query including a prior hashed value associated with the prior transaction block;
get the prior transaction block; and
transmit the prior transaction block to the client.

12. The system of claim 10, wherein the received transactions include a user receipt that has been previously transmitted to the mutually distrustful parties and indicates a state of the blockchain known to one or more of the mutually distrustful parties.

13. The system of claim 12, further operable to:
determine whether the user receipt matches a most recently transmitted receipt; and
when it is determined that the user receipt does not match the most recently transmitted receipt, ignore the received transactions associated with the user receipt.

14. The system of claim 10, wherein a received transaction is digitally signed by the requesting party to enable the system to determine whether the requesting party is authorized to make the transaction.

15. The system of claim 10, wherein the blockchain is initialized based on a seed value known to each of the mutually distrustful parties.

16. The system of claim 10, further comprising:
a query service operable to:
receive a sync request from one or more of the mutually distrustful parties; and
transmit the hashed value and a specified number of stored transactions to the one or more of the mutually distrustful parties.

17. The system of claim 16, wherein the sync request includes a continuation token indicating a last-received transaction by the one or more of the mutually distrustful parties, the continuation token indicates that the specified number of stored transactions have not been previously received by the one or more of the mutually distrustful parties.

18. The system of claim 10, wherein the hashed value replaces a tail-value of the blockchain and is used as the prior hashed value for a subsequent transaction block.

19. A hardware computer-readable memory storage medium including instructions, comprising:
receiving a request from a first party of the mutually distrustful parties, the request including:
an identifier for a verifiable outsourced ledger (VOL) maintaining state data that records previous transactions of the mutually distrustful parties;
a transaction to record within the VOL; and
a user receipt for a state of the VOL known to the first party, wherein the user receipt is compared to a current state of the VOL to verify the first party has a current view of the VOL based on at least one of:
a current height of the blockchain;
a frequency of the previous transactions of the mutually distrustful parties; or
a number of the previous transactions of the mutually distrustful parties;
conducting the transaction associated with the request;
assembling a transaction block, the transaction block including the conducted transaction and the current state of the VOL;
hashing the transaction block to produce an updated state of the VOL;
digitally signing the updated state to produce a receipt; and
transmitting the receipt to the mutually distrustful parties.

20. The hardware computer-readable memory storage medium of claim 19, wherein the current state of the VOL is represented in the transaction block as a cryptographic pointer and the VOL is accessible to the mutually distrustful parties via a cloud service provider.

* * * * *